US008468583B2

(12) United States Patent  (10) Patent No.: US 8,468,583 B2
Andrews  (45) Date of Patent: Jun. 18, 2013

(54) STREAMLINED PROCESS FOR ENROLLMENT OF MULTIPLE DIGITAL CERTIFICATES

(75) Inventor: Richard F. Andrews, Menlo Park, CA (US)

(73) Assignee: Symantec Corporation, Mountain View, CA (US)

(*) Notice: Subject to any disclaimer, the term of this patent is extended or adjusted under 35 U.S.C. 154(b) by 311 days.

(21) Appl. No.: 12/710,665

(22) Filed: Feb. 23, 2010

(65) Prior Publication Data

US 2011/0208962 A1 Aug. 25, 2011

(51) Int. Cl.
*G06F 7/04* (2006.01)

(52) U.S. Cl.
USPC .............. 726/6; 705/76; 713/156; 713/176; 726/18; 380/30

(58) Field of Classification Search
None
See application file for complete search history.

(56) References Cited

U.S. PATENT DOCUMENTS

| | | | | |
|---|---|---|---|---|
| 5,712,914 A | * | 1/1998 | Aucsmith et al. | 380/30 |
| 6,044,462 A | * | 3/2000 | Zubeldia et al. | 713/158 |
| 7,028,187 B1 | * | 4/2006 | Rosen | 713/175 |
| 7,349,871 B2 | * | 3/2008 | Labrou et al. | 705/26.35 |
| 7,770,230 B2 | * | 8/2010 | Byrne et al. | 726/30 |
| 2003/0126431 A1 | * | 7/2003 | Beattie et al. | 713/156 |
| 2004/0193872 A1 | * | 9/2004 | Saarepera et al. | 713/156 |
| 2006/0129804 A1 | * | 6/2006 | Satkunanathan et al. | 713/156 |
| 2009/0307486 A1 | * | 12/2009 | Grajek et al. | 713/156 |
| 2010/0185526 A1 | * | 7/2010 | Li | 705/26 |
| 2010/0228970 A1 | * | 9/2010 | Oka et al. | 713/156 |
| 2011/0113240 A1 | * | 5/2011 | Fu et al. | 713/156 |
| 2011/0145567 A1 | * | 6/2011 | Liu et al. | 713/156 |
| 2011/0246331 A1 | * | 10/2011 | Luther et al. | 705/27.1 |
| 2012/0030469 A1 | * | 2/2012 | Hsueh et al. | 713/175 |

OTHER PUBLICATIONS

Carl Holtje, "Security in Serverless network Enironments," Thesis; Department of Computer Science Rochester Institute of Technology (2004).*

Jonnsson J. et al., "Public-Key Cryptography Standards (PKCS) #1: RSA Cryptography Specifications Version 2.1" (2003).*

* cited by examiner

*Primary Examiner* — Hadi Armouche
*Assistant Examiner* — Jaron K Brunner
(74) *Attorney, Agent, or Firm* — Lowenstein Sandler LLP

(57) ABSTRACT

The enrollment process for purchasing multiple digital certificates configured using different cryptographic algorithms or hashing algorithms is streamlined. A certificate purchaser wishing to purchase two or more certificates is prompted to provide answers to common enrollment questions, such as the purchaser's contact information, payment details, web server software, and the like, using a simplified and streamlined enrollment process. Each certificate is optionally configured using a different hashing algorithm.

16 Claims, 2 Drawing Sheets

STREAMLINED PROCESS FOR ENROLLMENT OF MULTIPLE DIGITAL CERTIFICATES

BACKGROUND OF THE INVENTION

The present invention is related to digital certificates, and more particularly to a streamlined enrollment process for purchasing multiple digital certificates.

The security of transactions and e-commerce conducted via the Internet remains a primary concern. To be a viable alternative to traditional transactions, online transactions and connections need to be secure. A public key infrastructure is a known technique for achieving such security. In accordance with this technique, each party is assigned a public key and a private key. The public key is placed in a digital certificate and configured using a cryptographic algorithm, such as the well-known Rivest-Shamir-Alderman (RSA) algorithm, to authenticate its owner. A third party, commonly referred to as a certificate authority (CA), is often used to verify the identity of the owner of a public key pair.

A purchaser wishing to purchase a digital certificate from a CA completes a number of steps during an enrollment process. The purchaser is often asked to provide contact information (e.g., name, title, phone number, address) for three entities, namely a technical contact, a corporate contact and billing contact. The technical contact identifies the person who will install the certificate. The corporate contact identifies the person who must approve of the issuance of the certificate. The billing contact identifies the person who is responsible for payment. The form of payment and the relevant details must also be provided. The purchaser must also submit a certificate signing request (CSR) and indicate the vendor of web server software with which the certificate will be used. Other information may also be needed. A need continues to exist for simplifying the enrollment process for purchasing multiple certificates each keyed to a different cryptographic algorithm.

BRIEF SUMMARY OF THE INVENTION

In accordance with the present invention, the enrollment process for purchasing multiple digital certificates configured using different cryptographic algorithms or hashing algorithms is streamlined. A certificate purchaser (purchaser) wishing to purchase two or more certificates, is prompted to provide answers to common enrollment questions, such as the purchaser's contact information, payment details, web sever software, and the like, using a simplified and streamlined enrollment process.

In accordance with one embodiment of the present invention, a method of issuing a multitude of digital certificates to a client, includes, in part, receiving a request from the client to purchase the certificates, prompting the client to submit a multitude of certificate signing requests each associated with one of the certificates, prompting the client to supply contact information and payment information only once, and transmitting the certificates to the client. Each digital certificate is configured in accordance with a different cryptographic algorithm.

In one embodiment, one of the certificates is generated using the Elliptic Curve Cryptograph algorithm, commonly known as the ECC algorithm, and another one of the certificates is generated using the Rivest-Shamir-Alderman algorithm, commonly known as the RSA algorithm. In one embodiment, the request to purchase the certificates and the transmission of certificates are performed during the same enrollment phase. In one embodiment, different hashing algorithms are used to generate the certificates. In one embodiment, different hashing algorithms are used to generate the certificates only in response to a request by the client.

In accordance with one embodiment of the present invention, a method of issuing a multitude of digital certificates to a client, includes, in part, receiving a request from the client to purchase the certificates, prompting the client to submit a certificate signing request associated with the certificates, prompting the client to supply contact information and payment information only once, and transmitting the certificates to the client. Each digital certificate is configured in accordance with a different hashing algorithm.

In one embodiment, one of the certificates is generated using the secure hashing algorithm one (SHA-1), and another one of the certificates is generated using the secure hashing algorithm two (SHA-2). In one embodiment, the request to purchase the certificates and the transmission of certificates are performed during the same enrollment phase. In one embodiment, different cryptograph algorithms are used to generate the certificates. In one embodiment, different hashing algorithms are used to generate the certificates only in response to a request by the client.

A computer system, in accordance with one embodiment of the present invention, is adapted to receive a request from a client to purchase a multitude of certificates. In response, the computer system prompts the client to submit a multitude of certificate signing requests each associated with a different one of the certificates. The computer system prompts the client to supply contact information and payment information only once. Thereafter, the computer system generates the certificates in accordance with different cryptographic algorithms and transmits the certificates to the client.

In one embodiment, the computer system generates one of the certificates using the ECC algorithm and generate another one of the certificates using the RSA algorithm. In one embodiment, the computer system receives the request, and then transmits the certificates during the same enrollment phase. In one embodiment, the computer system generates one of the certificates using the SHA-1 hashing algorithm and generates another one of the certificates using the SHA-2 hashing algorithm. In one embodiment, the computer system uses different hashing algorithms to generate the certificates only in response to a request by the client.

A computer system, in accordance with one embodiment of the present invention, is adapted to receive a request from a client to purchase a multitude of certificates. In response, the computer system prompts the client to submit a certificate signing request. The computer system prompts the client to supply contact information and payment information only once. Thereafter, the computer system generates the certificates in accordance with different hashing algorithms and transmits the certificates to the client.

In one embodiment, the computer system generates one of the certificates using the SHA-1 algorithm, and generates another one of the certificates using the SHA-2 algorithm. In one embodiment, the computer system receives the request, and then transmits the certificates during the same enrollment phase. In one embodiment, the computer system generates the certificates using different cryptographic algorithms. In one embodiment, the computer system uses different hashing algorithms to generate the certificates only in response to a request by the client.

DETAILED DESCRIPTION OF THE INVENTION

Figure 1:
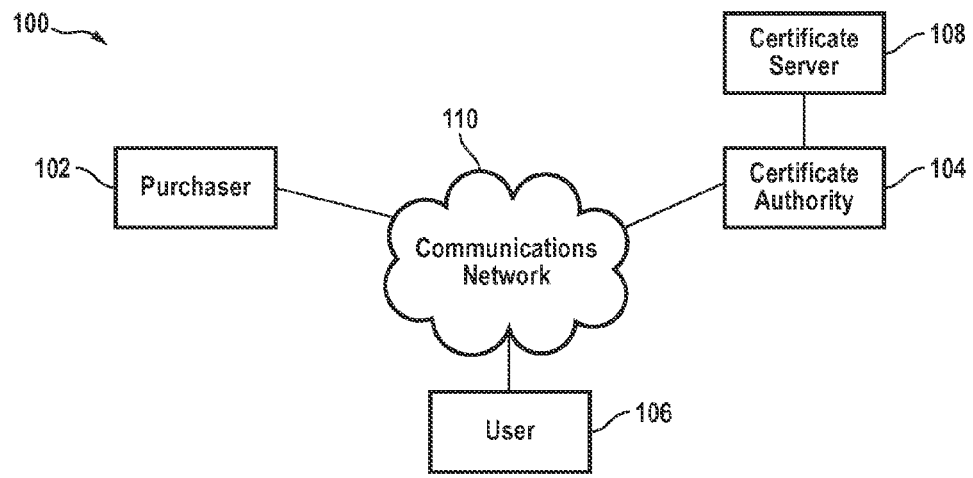
FIG. 1 is a block diagram of a network communication system adapted to enable purchase and use of digital certificates, in accordance with one exemplary embodiment of the present invention.

In accordance with the present invention, the enrollment process for purchasing multiple digital certificates configured using different cryptographic algorithms or hashing algorithms is streamlined. A certificate purchaser (hereinafter alternatively referred to as purchaser or client) wishing to purchase two or more certificates, is prompted to provide answers to common enrollment questions, such as the purchaser's contact information, payment details, web sever software, and the like, using a simplified and streamlined enrollment process.

Public key cryptography is a technique for providing secure communications using a pair of keys. Each key pair includes a public key and a private key. Typically, the private key is securely created and held by an entity, while the public key is made widely available. The public and private keys are generated using related mathematical algorithms such that a message encrypted by one key may be decrypted only by the other. One known algorithm for generating public keys is the RSA algorithm.

A private key may be used to digitally sign records. An entity digitally signs a record by encrypting either the record or a processed version of the record using the entity's private key. This allows a third party to authenticate the record by verifying that (i) it is that entity's private key (rather than some other key) which has been used to digitally sign the record; (ii) the contents of the record have not changed since the record has been digitally signed; and (iii) if the corresponding public key is held to be bound to the entity, then the entity cannot later deny signing the record.

The use of public key cryptography addresses many of the inherent security problems in an open network such as the Internet. However, two significant problems remain. First, parties must be able to access the public keys of many entities in an efficient manner. Second, since communications and transactions are secured by relying upon the key pairs, and entities are associated with their public keys, a secure method enabling third parties to establish that a certain public key is bound to a certain entity is required.

A public key management infrastructure uses a digital certificate to address these two problems. A digital certificate, issued by a third party known as a certification authority (CA), is a record which binds a public key to a certain entity, such as an individual, a legal entity, a web server, or other types of users. The digital certificate contains information related to the identity of the subscribing entity and the entity's public key. A digital certificate is digitally signed by the CA to secure this information.

For security and other reasons, digital certificates typically expire after a certain period of time. For example, when digital certificates are issued, they may have an effective date and an expiration date, with the digital certificate being potentially valid only between these dates. Furthermore, if a digital certificate is revoked prior to its expiration date, notice of that status may be issued by placing it onto a certificate revocation list or by other means.

As is well known, a purchaser wishing to purchase a digital certificate from a Certificate Authority (CA) is asked to complete a number of steps during an enrollment process. The purchaser is asked to provide contact information (e.g., name, title, phone number, address) for three entities, namely a technical contact, a corporate contact and a billing contact. The technical contact identifies the person who will install the certificate. The corporate contact identifies the person who must approve of the issuance of the certificate. The billing contact identifies the person who is responsible for payment. The form of payment and the relevant details must also be provided. The purchaser must also submit a certificate signing request (CSR) and indicate the vendor of web server software with which the certificate will be used.

Most digital certificates include a key defined by a cryptographic algorithm known as Rivest-Shamir-Alderman (RSA) algorithm. However, a competing algorithm, commonly known as the Elliptic Curve Cryptograph (ECC), is gaining popularity and acceptance. Accordingly, a number of web server software vendors have enabled their software to be configured with both RSA and ECC keys. In accordance with one embodiment of the present invention, a simple and streamlined enrollment process is used to enable a user to purchase multiple certificates configured with different cryptographic algorithms.

FIG. 1 is a block diagram of a network communication system 100 adapted to enable purchase and use of digital certificates, in accordance with one exemplary embodiment of the present invention. System 100 is shown as including, in part, a purchaser 102, a CA 104, and a user 108, all of whom communicate with one another via communications network 110. System 100 is also shown as including a certificate server 108. Purchaser 102 maintains possession of its private key securely and makes its public key available by means of a digital certificate issued by CA 104. Certificate server 108 is used by CA 104 to issue digital certificates.

User 106 uses purchaser 102's digital certificate to authenticate purchaser 102. For example, assume an entity claiming to be purchaser 102 seeks a transaction with user 106. To proves its authenticity, the entity supplies its digital certificate to user 106. If user 106 trusts the issuer of the digital certificate, i.e., CA 104, user 106 can trust that purchaser 102, named in the digital certificate, is associated with the public key contained in the certificate. Hence, if the entity has the associated private key, then user 106 can trust that the entity is the purchaser 102 named in the digital certificate. If user 106 does not trust issuer 104, user 106 may request CA 104's digital certificate in order to authenticate the identity of CA 104.

Figure 2:
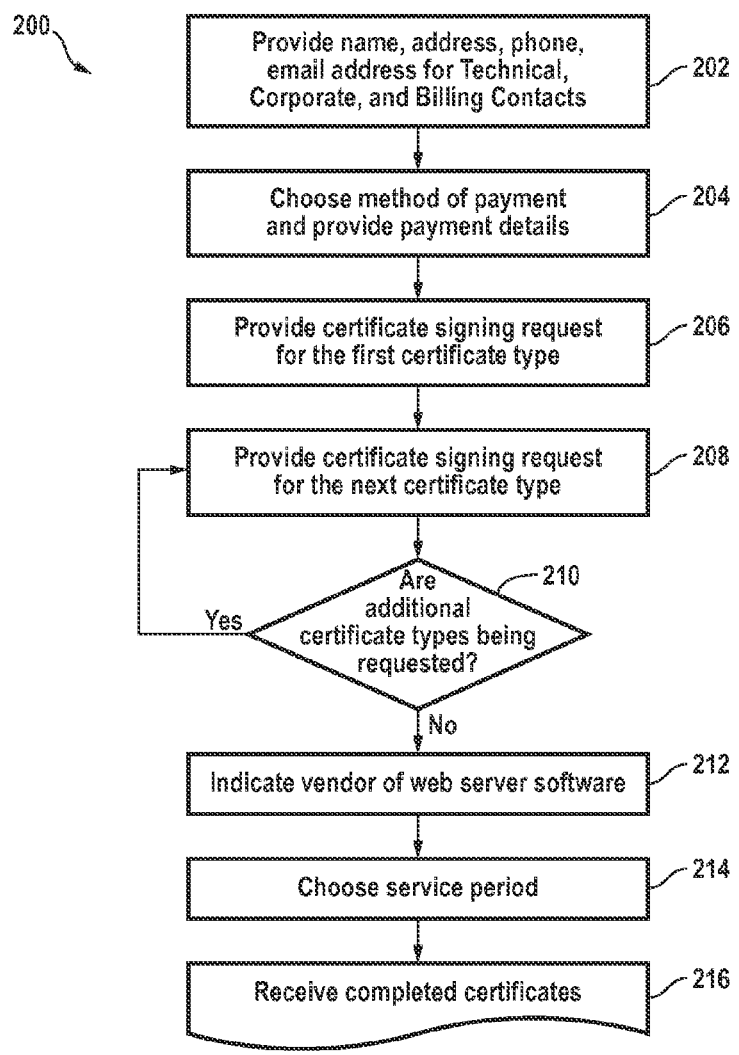
FIG. 2 is a flowchart of steps carried out to request and receive a multitude of digital certificates generated using different cryptographic algorithms, in accordance with one exemplary embodiment of the present invention.

FIG. 2 is a flowchart 200 of steps carried out to request and receive a multitude of digital certificates of different cryptographic types. Purchaser provides 202 contact information, such as name, address, phone number, e-mail address, and the like, for three entities, namely for a technical contact, a corporate contact and a billing contact. The purchaser chooses a method of payment and provides 204 payment details. The purchaser subsequently provides 206 a certificate signing request for the first certificate type which may be, for example, an RSA certificate. The purchaser thereafter provides 208 a certificate signing request for the next certificate type which may be, for example, an ECC certificate. If the purchaser decides 210 to purchase an additional certificate type, the purchaser provides 208 a certificate signing request for that certificate type. If, on the other hand, the purchaser decides 210 not to purchase any additional certificate types, the purchaser is asked to indicate 212 the vendor of web server software that the purchaser uses. After selecting 214 the service period for the requested certificates, the purchaser receives the completed certificates.

Assume that a purchaser of a multitude of certificates (such as a bank) has received and deployed both an ECC and an RSA certificate. In one embodiment, the purchaser may use one server(s), e.g. server A, to support ECC related accesses and another server(s), server B, to support RSA related requests. When a user (such as one of the bank's customers) seeks to access the purchaser's web site and authenticate the purchaser's identity, the user's web client software is identified. If the user's web client software is identified as supporting the ECC algorithm, the user is directed to purchaser server A, and if the user's web client software is identified as supporting the RSA algorithm, the user is directed to purchaser server B. In another embodiment, a purchaser's web server software may be configured to support both, for example, RSA and ECC algorithms. In such embodiments, after the user's web server software identifies the encryption algorithms it supports, the purchaser's web server software determines which certificate to send to the user. For example, if the purchaser's web server software is notified that the user's web client software supports both ECC and RSA algorithms, the purchaser's web server sends the ECC certificate to the user. If the purchaser's web server software is notified that the user's web client software supports, for example, only the RSA algorithm, the purchaser's web server sends the RSA certificate to the user.

As is well known, before being encrypted, information contained in a digital certificate is often hashed to generate a relatively smaller fixed-size block of data representative of the certificate information. A hashing algorithm, commonly referred to as the secure hashing algorithm one (SHA-1) is widely use to hash digital certificates. As the security of certificates generated using the SHA-1 algorithm becomes a concern, more secure algorithms, such as the SHA-2 algorithm is being developed and deployed. Before the SHA-2 algorithm is widely adopted and built into web server software, both SHA-1 and SHA-2 hashing algorithms need to be supported.

In accordance with another embodiment of the present invention, when a purchaser applies for a digital certificate, a CA issues a number of certificates to the purchaser, one generated using the SHA-1, and each of the other ones generated using a different hashing algorithm. For example, if the SHA-2 algorithm is expected to be used in the near future, the CA issues two digital certificates to the purchaser, one generated using the SHA-1 algorithm, and one generated using the SHA-2 algorithm. In yet other embodiments, the purchaser requesting the certificate may be offered an option of selecting one or more hashing algorithms from a list, and subsequently receive one or more certificates in conformity with the selections made. For example, assume that a purchaser receives two certificates, one generated using the SHA-1 algorithm and one generated using the SHA-2 algorithm. The purchaser first uses the SHA-1 configured certificate. However, to guard against the possibility that the security of certificates generated using the SHA-1 algorithm may have been compromised, the purchaser starts using the SHA-2 certificate without any interruption of its services or without the need to enroll for and purchase a SHA-2 configured certificate at a later time.

Figure 3:
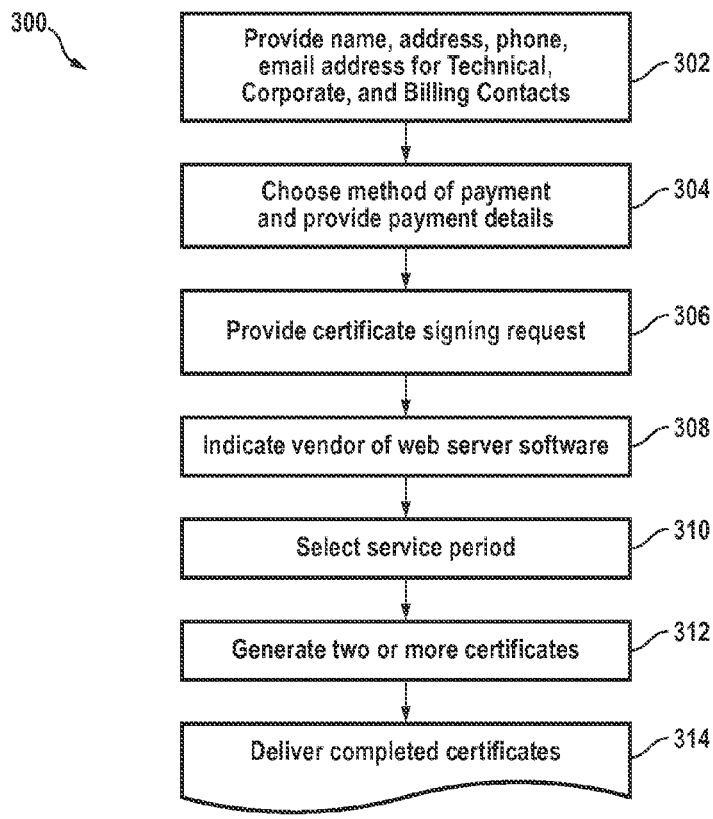
FIG. 3 is a flowchart of steps carried out to request and receive a multitude of digital certificates generated using different hashing algorithms, in accordance with one exemplary embodiment of the present invention.

FIG. 3 is a flowchart 300 of steps carried out to request and receive a multitude of digital certificates each generated using a different hashing algorithm. The purchaser provides 302 contact information, such as name, address, phone number, e-mail address, and the like, for three entities, namely for a technical contact, a corporate contact and a billing contact. The purchaser chooses a method of payment and provides 304 payment details. The purchaser subsequently provides 306 a certificate signing request and indicates 308 the vendor of web server software that the purchaser uses. After selecting 310 the service period for the requested certificates, two or more certificates are generated 312 and delivered 316 to the purchaser. In one embodiment, one of the certificates is generated using the SHA-1 algorithm, while another one of the certificates is generated using the SHA-2 algorithm. In other embodiments, any number of hashing algorithms may be used to generate the certificates before delivery to the purchaser. In one embodiment, the CA may offer to the purchaser the option of receiving certificates generated using different hashing algorithms. In another embodiment, the CA may unilaterally decide to generate and deliver to a purchasers a multitude of certificates generated using different hashing algorithms.

Embodiments of the invention may be implemented in hardware, software, or any combinations thereof. Embodiments of the present invention may be incorporated as standalone systems that are configured to handle information for processing using a network interface. Embodiments of the present invention may also be incorporated into one or more distributed systems.

Figure 4:
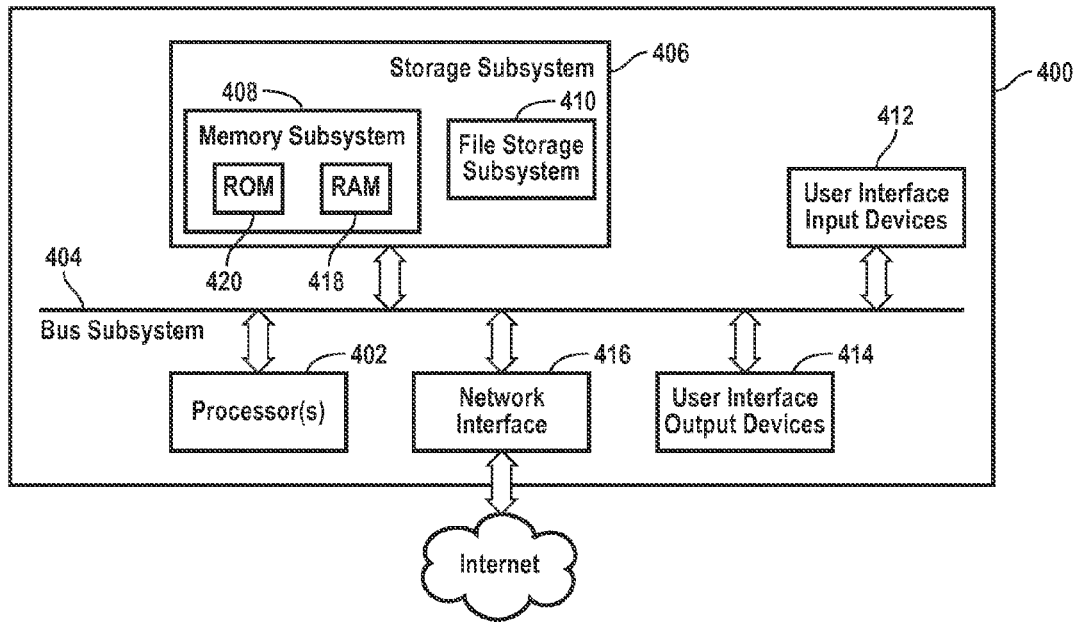
FIG. 4 is a simplified block diagram of a system configured to enroll and issue digital certificates to a purchaser in accordance with one exemplary embodiment of the present invention.

FIG. 4 is a simplified block diagram of a system 400 configured to enroll and issue digital certificate(s) to a purchaser in accordance with one embodiment of the present invention. System 400 is shown as including at least one processor 402, which communicates with a number of peripheral devices via a bus subsystem 404. These peripheral devices may include a storage subsystem 406, including, in part, a memory subsystem 408 and a file storage subsystem 410, user interface input devices 412, user interface output devices 414, and a network interface subsystem 416 that may include a wireless communication port. The input and output devices allow user interaction with data processing system 402.

Network interface subsystem 416 provides an interface to the Internet. Network interface subsystem 416 serves as an interface for receiving data from other sources and for transmitting data to other sources from the processing device. Embodiments of network interface subsystem 416 include an Ethernet card, a modem (telephone, satellite, cable, ISDN, etc.), (asynchronous) digital subscriber line (DSL) units, and the like.

User interface input devices 412 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term input device is intended to include all possible types of devices and ways to input information to processing device.

User interface output devices 414 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term output device is intended to include all possible types of devices and ways to output information from the processing device.

Storage subsystem 406 may be configured to store the basic programming and data constructs that provide the functionality in accordance with embodiments of the present invention. For example, according to one embodiment of the present invention, software modules implementing the functionality of the present invention may be stored in storage subsystem 406. These software modules may be executed by processor(s) 402. Such software modules can include a receiver module that receives from the client common information that is to be embodied in a multitude of certificates and special information that distinguishes one certificate from the rest that share the common information. The receiver module can be in communication with a certificate generation module that applies the common information across a multitude of certificates and processes the special information to generate certificates using different hash and/or encryption algorithms as specified in the special information. The certificate generation module can be in communication with a transmission module that sends the generated certificates that contain common information and are generated in accordance with the special information to a recipient. Storage subsystem 406 may also provide a repository for storing data used in accordance with the present invention. Storage subsystem 406 may include, for example, memory subsystem 208 and file/disk storage subsystem 410.

Memory subsystem 408 may include a number of memories including a main random access memory (RAM) 418 for storage of instructions and data during program execution and a read only memory (ROM) 420 in which fixed instructions are stored. File storage subsystem 410 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 404 provides a mechanism for enabling the various components and subsystems of the processing device to communicate with each other. Although bus subsystem 404 is shown schematically as a single bus, alternative embodiments of the bus subsystem may utilize multiple busses.

The processing device may be of varying types including a personal computer, a portable computer, a workstation, a network computer, a mainframe, a kiosk, or any other data processing system. It is understood that the description of the processing device depicted in FIG. 2 is intended only as one example. Many other configurations having more or fewer components than the system shown in FIG. 2 are possible.

The above embodiments of the present invention are illustrative and not limiting. Various alternatives and equivalents are possible. Other additions, subtractions or modifications are obvious in view of the present disclosure and are intended to fall within the scope of the appended claims.

What is claimed is:

1. A method comprising:
receiving, by a processing device associated with a certificate authority (CA), a request from a client to purchase a plurality of certificates;
receiving common contact information, payment information and a plurality of certificate signing requests from the client;
generating the plurality of certificates by the processing device responsive to the request for the plurality of certificates, the generating comprising:
generating a first certificate using the common contact information and a first cryptographic algorithm specified in a first certificate signing request of the plurality of certificate signing requests, wherein at least a portion of the common contact information is embodied in the first certificate; and
generating a second certificate using the common contact information and a second cryptographic algorithm specified in a second certificate signing request of the plurality of certificate signing requests, wherein at least a portion of the common contact information is embodied in the second certificate; and
transmitting the plurality of certificates to the client;
wherein the receiving of the request and the transmitting of the plurality of certificates are performed during a single enrollment process.

2. The method of claim 1 wherein the first cryptographic algorithm is an ECC algorithm, and wherein the second cryptographic algorithm is an RSA algorithm.

3. The method of claim 1 further comprising:
generating the first certificate using a first hashing algorithm; and
generating the second certificate using a second hashing algorithm.

4. A method comprising:
receiving, by a processing device associated with a single certificate authority (CA), a request from a client to purchase a plurality of certificates;
receiving common contact information, payment information and a certificate signing request from the client;
generating the plurality of certificates by the processing device responsive to the request for the plurality of certificates, the generating comprising:
generating a first certificate using the common contact information, the certificate signing request and a first hashing algorithm, wherein at least a portion of the common contact information is embodied in the first certificate; and
generating a second certificate using the common contact information, the certificate signing request and a second hashing algorithm, wherein at least a portion of the common contact information is embodied in the second certificate; and
transmitting the plurality of certificates to the client;
wherein the receiving of the request and the transmitting of the plurality of certificates are performed during a single enrollment process.

5. The method of claim 4 wherein the first hashing algorithm is a SHA-1 algorithm, and wherein the second hashing algorithm is a SHA-2 algorithm.

6. The method of claim 4 further comprising:
generating the first certificate using a first cryptographic algorithm; and
generating the second certificate using a second cryptographic algorithm.

7. A computer system comprising:
a memory; and
a processor coupled to the memory, wherein the processor is configured to:
receive a request from a client to purchase a plurality of certificates;
receive common contact information, payment information an one or more certificate signing requests from the client;
generate the plurality of certificates responsive to the request for the plurality of certificates, wherein generating the plurality of certificates comprises:
generating a first certificate using the common contact information and at least one of a first cryptographic algorithm or a first hashing algorithm, wherein at least a portion of the common contact information is embodied in the first certificate; and generating a second certificate using the common contact information and at least one of a second cryptographic algorithm or a second hashing algorithm, wherein at least a portion of the common contact information is embodied in the second certificate; and transmitting the plurality of certificates to the client;

wherein the receiving of the request and the transmitting of the plurality of certificates are performed during a single enrollment process.

8. The computer system of claim 7 wherein said computer is further adapted to:

generate the first certificate using an ECC algorithm; and
generate the second certificate using an RSS algorithm.

9. The computer system of claim 7 wherein said processor is further configured to:

generate the first certificate using a SHA-1 algorithm; and
generate the second certificate using a SHA-2 algorithm.

10. The method of claim 1, further comprising:

responsive to receiving the request to purchase the plurality of certificates, prompting the client to supply the common contact information, the payment information and the plurality of certificate signing requests.

11. A non-transitory computer readable storage medium having instructions that, when executed by a processing device, cause the processing device to perform a method comprising:

receiving, by the processing device, a request from a client to purchase a plurality of certificates;

receiving common contact information, payment information and a plurality of certificate signing requests from the client;

generating the plurality of certificates by the processing device responsive to the request for the plurality of certificates, the generating comprising:

generating a first certificate using the common contact information and a first cryptographic algorithm specified in a first certificate signing request of the plurality of certificate signing requests, wherein at least a portion of the common contact information is embodied in the first certificate; and generating a second certificate using the common contact information and a second cryptographic algorithm specified in a second certificate signing request of the plurality of certificate signing requests, wherein at least a portion of the common contact information is embodied in the second certificate; and transmitting the plurality of certificates to the client;

wherein the receiving of the request and the transmitting of the plurality of certificates are performed during a single enrollment process.

12. The non-transitory computer readable storage medium of claim 11 wherein the first cryptographic algorithm is an ECC algorithm, and wherein the second cryptographic algorithm is an RSA algorithm.

13. The non-transitory computer readable storage medium of claim 11, the method further comprising:

generating the first certificate using a first hashing algorithm; and
generating the second certificate using a second hashing algorithm.

14. The non-transitory computer readable storage medium of claim 11, the method further comprising:

responsive to receiving the request to purchase the plurality of certificates, prompting the client to supply the common contact information, the payment information and the plurality of certificate signing requests.

15. The method of claim 4, further comprising:

responsive to receiving the request to purchase the plurality of certificates, prompting the client to supply the common contact information, the payment information and the certificate signing request.

16. The computer system of claim 7, wherein the processor is further configured to prompt the client to supply the common contact information, the payment information and the one or more certificate signing requests responsive to receiving the request to purchase the plurality of certificates.

* * * * *